United States Patent Office 3,813,419
Patented May 28, 1974

3,813,419
PREPARATION OF PHENOLIC ETHERS
Nicholas J. Bach and Eugene Farkas, Indianapolis, Ind., assignors to Eli Lilly and Company, Indianapolis, Ind.
No Drawing. Continuation-in-part of application Ser. No. 127,771, Mar. 24, 1971, now Patent No. 3,697,558.
This application Apr. 15, 1971, Ser. No. 134,420
Int. Cl. C07c 167/30
U.S. Cl. 260—397.5 A          3 Claims

ABSTRACT OF THE DISCLOSURE

An improved process for preparing cyclopentyl ethers of phenols.

CROSS-REFERENCE

This application is a continuation-in-part of our copending application, Ser. No. 127,771, filed Mar. 24, 1971 and now Pat. No. 3,697,558.

BACKGROUND OF THE INVENTION

Cyclopentyl ethers of phenols are customarily prepared by first forming a metal salt of the phenol and then reacting the metal salt with a cyclopentyl halide in ethanol or similar solvent. Yields of phenol cyclopentyl ethers utilizing the above procedure are inadequate and, in the case of phenols of a complex structure such as estriol or ethynylestradiol, the yields are not substantially greater than zero.

It is an object of this invention to provide a process for preparing cyclopentyl ethers of phenols in higher yields than that previously found.

SUMMARY

In fulfillment of the above and other objects this invention provides a process for preparing cyclopentyl ethers of phenols utilizing the following reaction steps: (1) formation of a metal salt with the phenolic hydroxyl such as the sodium or thallium salt; (2) reaction of the metallic salt with cyclopentyl bromide in dimethylformamide (to be referred to hereinafter as DMF).

In carrying out our novel reaction sequence, the phenol is dissolved in methanol and treated with an excess of freshly prepared sodium methoxide. Alternatively, a solution of the phenol in ethanol can be treated with thallium ethylate. Alcoholates of other reactive monovalent metals such as potassium, lithium, rubidium, or cesium can also be employed. After the metallic salt of the phenol is formed, it is recovered as a solid by evaporation of the solvents and is suspended in benzene and the suspension added to a large volume of DMF or is suspended or dissolved directly in DMF. Cyclopentyl bromide, preferably in DMF, is then added to the suspension at refluxing temperature, preferably under a nitrogen atomsphere. The desired cyclopentyl ether formed by the above reaction is recovered by standard procedures.

This invention is further illustrated by the following specific examples.

EXAMPLE 1

11.3 g. of 17α-ethynylestriol, prepared by the method of Engelfried et al., Arzneim. Forsch., 16, 1518–21 (1966), were dissolved in 500 ml. of methanol. A 50 percent molar excess of freshly prepared sodium methoxide in methanol was added. The resulting solution was concentrated in vacuo to a solid comprising the sodium salt of 17α-ethynyl-estriol. The solid was dissolved with warming in 500 ml. of dimethylformamide. 50 ml. of cyclopentyl bromide were added and the mixture heated to reflux under a nitrogen atmosphere for about 4 hours. The reaction mixture was cooled and then diluted with 1 l. of ethyl acetate and 1 l. of water. The resulting organic layer was washed three times with water followed by saturated aqueous sodium chloride wash and was then dried. Evaporation of the solvent in vacuo yielded a solid residue which was slurried with chloroform and chromatographed over about 100 g. of Florisil. Elution with chloroform yielded a brownish solid residue on evaporation of the solvent. Recrystallization of this residue from a mixture of ethyl ether and hexane yielded about 7.7 g. of 17α-ethynylestriol 3-cyclopentyl ether, melting at about 162–5° C.

EXAMPLE 2

2.1 g. of 17α-ethynylestriol were dissolved in 100 ml. of absolute ethanol. A solution containing about 0.6 ml. of thallium ethylate in 10 ml. of benzene was added with stirring in dropwise fashion. Stirring was continued for another 10 minutes after which time the solvents were removed by evaporation in vacuo. The residue, comprising the thallium salt of 17α-ethynylestriol, was slurried with 100 ml. of dimethylformamide. 10 ml. of cyclopentyl bromide were added and the mixture heated at 90–95° C. for 4 hours under a nitrogen atmosphere. 17α-Ethynylestriol 3-cyclopentyl ether thus produced was isolated and purified as in Example 1.

EXAMPLE 3

A solution of 5 gms. of diethylstilbestrol in 50 ml. of anhydrous ethanol was added to a solution containing 9.2 g. of thallium ethoxide in 25 ml. of benzene. The thallium salt of diethylstilbestrol precipitated immediately. The reaction mixture was stirred at ambient temperature for 15 minutes, after which time the solvents were removed by evaporation in vacuo. 50 ml. of DMF were added to the solid residue, comprising the di-thallium salt of diethylstilbestrol, followed by 5.5 g. of cyclopentyl bromide. The reaction mixture was heated at about 120° C. for about 17 hours. The reaction mixture was cooled, water was added and the di(cyclopentyl)ether of diethylstilbestrol formed in the above reaction was extracted into ether. The compound was purified by chromatography over alumina. Diethylstilbestrol-4,4'-di(cyclopentyl)ether thus prepared melted at about 107–108° C.

The following cyclopentyl ethers can be prepared by the above procedure:

p-Nitrophenol cyclopentyl ether
2,4-Dinitrophenol cyclopentyl ether
β-Naphthol cyclopentyl ether
p-Cyclohexylphenol cyclopentyl ether
1,8-Dihydroxynaphthalene di(cyclopentyl)ether
p-Hydroxybiphenyl cyclopentyl ether
Hydroquinone di(cyclopentyl)ether
1,4-Dihydroxynaphthalene di(cyclopentyl)ether
4,4'-Dihydroxybiphenyl di(cyclopentyl)ether
o-Chlorophenol cyclopentyl ether
o-Cresol cyclopentyl ether
o-Bromophenol cyclopentyl ether
m-Cresol cyclopentyl ether
o-Ethylphenol cyclopentyl ether
m-Ethylphenol cyclopentyl ether
Resorcinol monomethyl ether cyclopentyl ether
p-Butylphenol cyclopentyl ether
m-Chlorophenol cyclopentyl ether
m-Bromophenol cyclopentyl ether
p-Cresol cyclopentyl ether
2,4-Dibromophenol cyclopentyl ether
p-Chlorophenol cyclopentyl ether
m-Iodophenol cyclopentyl ether
Phenol cyclopentyl ether
2,4-Dichlorophenol cyclopentyl ether
o-Iodophenol cyclopentyl ether
o-Nitrophenol cyclopentyl ether
p-Ethylphenol cyclopentyl ether o-Cyclohexylphenol cyclopentyl ether
Hydroquinone monomethyl ether cyclopentyl ether
o-Hydroxybiphenyl cyclopentyl ether
3,4-Dimethylphenol cyclopentyl ether
3,5-Dimethylphenol cyclopentyl ether
p-Bromophenol cyclopentyl ether
Hexylresorcinol cyclopentyl ether
Pseudocumenol cyclopentyl ether
2,5-Dimethylphenol cyclopentyl ether
α-Naphthol cyclopentyl ether
p-Iodophenol cyclopentyl ether
m-Nitrophenol cyclopentyl ether
p-t-Butylphenol cyclopentyl ether
Catechol di(cyclopentyl)ether
Orcinol di(cyclopentyl)ether
2,2'-Dihydroxybiphenyl di(cyclopentyl)ether.

Of particular interest are the cyclopentyl ethers of naturally occurring female hormones, estrone, estradiol and estriol, or their 17α-ethynyl derivatives including specifically 17α-ethynylestriol 3-cyclopentyl ether. The following cyclopentyl ethers of estrogenic phenols can be prepared by the above procedure and constitute a preferred class of the compounds within the scope of this invention.

Estrone 3-cyclopentyl ether
Estradiol 3-cyclopentyl ether
Estriol 3-cyclopentyl ether
17α-ethynylestradiol 3-cyclopentyl ether
17α-ethynylestriol 3-cyclopentyl ether.

The last three compounds are useful in treating menopausal syndrome in women, as set forth in the copending application of Kraay and Farkas, Ser. No. 127,690, filed Mar. 23, 1971, now abandoned, the subject matter of which is contained in the pending application of Kraay and Farkas, Ser. No. 136,671, filed Apr. 23, 1971.

We claim:
1. The process which comprises forming a metallic salt of the phenolic group of 17α-ethynylestriol with a monovalent metal of the group consisting of sodium and thallium and then contacting said metallic salt with cyclopentyl bromide in dimethyl formamide solution to yield the cyclopentyl ether of said phenolic group.
2. A process according to claim 1 in which the metallic salt is a sodium salt.
3. A process according to claim 1 in which the metallic salt is a thallium salt.

References Cited
UNITED STATES PATENTS

| | | | |
|---|---|---|---|
| 3,032,594 | 5/1962 | Towle | 260—612 R |
| 3,192,263 | 6/1965 | Spiegler | 260—612 R |
| 3,387,041 | 6/1968 | Oscar | 260—612 R |
| 3,576,882 | 4/1971 | Clark | 260—612 R |

OTHER REFERENCES

Kittila: Dimethylformamide Chemical Uses (1967), pp. 72–75.

BERNARD HELFIN, Primary Examiner

U.S. Cl. X.R.
260—613 A, 612 D, 612 R, 613 R, 397.4